UNITED STATES PATENT OFFICE 2,640,056

PYRAZOLINE SULPHONIC ACIDS

John David Kendall and George Frank Duffin, Ilford, England, assignors to Ilford Limited, Ilford, England, a British company No Drawing. Application May 29, 1950, Serial No. 165,118. In Great Britain June 3, 1949

9 Claims. (Cl. 260—310)

This invention relates to the production of aryl-substituted pyrazoline compounds which contain sulphonic acid groups and are fluorescent. The said compounds are of especial value as agents for whitening or brightening fibres and films as described in our co-pending application Serial No. 165,116, filed of even date herewith.

The compounds of the present invention may be represented by the general Formula I:

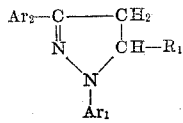   I where $Ar_1$ is an aromatic radicle containing a sulphonic acid group, $Ar_2$ is an aromatic radicle and $R_1$ is a hydrogen atom or a substituted or unsubstituted hydrocarbon group. $Ar_1$ and $Ar_2$ may be, for example, phenyl, diphenyl, diphenyl ether, or naphthalene, or corresponding substituted groups, and $R_1$ may be an alkyl, aryl or aralkyl group or corresponding substituted group, e. g. methyl, ethyl or higher alkyl, phenyl or naphthyl, or benzyl.

Normally aryl hydrazines containing a sulphonic acid group do not condense with a carbonyl group directly attached to an aromatic nucleus to give an aryl hydrazine sulphonic acid. Thus, for example, when phenyl hydrazine sulphonic acid is condensed with benzaldehyde the product obtained has the formula $HO_3S.C_6H_4.NH.NH.CH(OH).C_6H_5$ which is unstable, particularly in hot aqueous solution (Biltz et al., Berichte der Deutschen Chemischen Gesellschaft 35, 2004).

No examples are known where direct condensation takes place between an aryl hydrazine sulphonic acid and an aromatic ketone.

It has now been found that compounds of the above general formula can be obtained by condensing a ketone of the general Formula II:

$Ar_2COCH=CH(R_1)$   II or a corresponding dialkylamino addition compound of the general Formula III:

   III (where $R_2$ and $R_3$ are alkyl groups) with an aryl hydrazine sulphonic acid.

The dialkylamino addition products of general Formula III may be prepared by condensing an acetophenone of the formula $Ar_2COCH_3$ with an aldehyde $R_1CHO$ and a dialkylamino hydrochloride

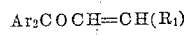

by heating in a solvent such as alcohol. The product thus obtained may be used with or without isolation and either as the free ketone or the hydrochloride in the process of this invention.

The reaction between the compound of general Formula II or III and the aryl hydrazine sulphonic acid is preferably effected in aqueous alkaline solution, mild alkali such as alkali carbonate or alkali acetate being preferred.

The course of the reaction using a compound of general Formula II is as follows:

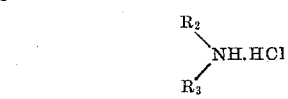

Using a compound of general Formula III, exactly the same product is obtained thus:

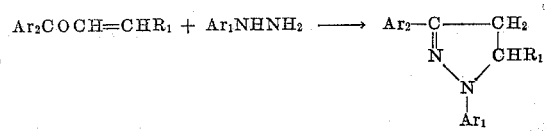

The dialkylamine

is split off in the reaction and may be recovered and re-used. Since the dialkylamine does not contribute directly to the final product, it is convenient to use a readily available dialkylamine and a diethylamine or dimethylamine is therefore suitable.

The following examples will serve to illustrate the invention, but are not to be regarded as limiting it in any way:

EXAMPLE 1

1-P-SULPHOPHENYL-3 : 5-DIPHENYL-PYRAZOLINE

Benzalacetophenone (20.8 g.), phenylhydrazine p-sulphonic acid (18.8 g.) and crystalline sodium acetate (14 g.) were dissolved in ethanol (200 cc.) and the solution boiled on a steam bath for three hours. The solution was diluted with water (400 cc.) and acidified with hydrochloric acid to precipitate the product as fine yellow plates.

EXAMPLE 2

SODIUM SALT OF 1-M-SULPHOPHENYL-3:5-DIPHENYL PYRAZOLINE

Phenylhydrazine m-sulphonic acid (44.8 g.) was dissolved in 10% aqueous sodium carbonate (350 cc.) and the solution added to a solution of benzalacetophenone (42 g.) in ethanol (100 cc.). The resulting mixture was heated on a steam bath for six hours during which time the alcohol was boiled off. The solution was cooled, diluted with a solution of sodium chloride (100 g.) in water (1 litre) when the product was precipitated as yellow plates which were filtered and washed with a little water and ether.

EXAMPLE 3

SODIUM SALT OF 1-P-SULPHOPHENYL-3-PHENYL PYRAZOLINE (a) *Preparation of ω-dimethylaminopropiophenone hydrochloride*

Acetophenone (115 cc.), paraformaldehyde (40 g.) and dimethylamine hydrochloride (90 g.) were dissolved in ethanol (200 cc.), a few drops of hydrochloric acid added and solution refluxed for 30 minutes. A further quantity (40 g.) of paraformaldehyde was then added and the solution refluxed for a further six hours. Cooling in ice caused the produce to crystallise out, when it was removed by filtration and washed with ether.

(b) *Condensation to the pyrazoline*

The solid obtained above was added to a solution of phenyl hydrazine p-sulphonic acid (190 g.) dissolved in 10% aqueous sodium carbonate (1300 cc.) and the solution boiled for two hours. On cooling, the product crystallised in pale yellow plates, and was filtered off and washed with a small quantity of water. Acidification of a solution of the sodium salt with hydrochloric acid yielded the free acid as pale yellow crystals.

In an alternative method the ω-dialkylaminopropiophenone hydrochloride was added in solution and without isolation directly to the hydrazine sulphonic acid dissolved in sodium carbonate. The yield obtained and the purity of the resulting product were unaffected.

EXAMPLE 4

SODIUM SALT OF 1-P-SULPHOPHENYL-3-P-(P"TOLUENE-SULPHONYLAMINO PHENYL PYRAZOLINE

P(p - toluenesulphonylamino) - acetophenone (145 g.), dimethylamine hydrochloride (42.5 g.) and paraformaldehyde (30 g.) were dissolved in ethanol (2½ litres) and concentrated hydrochloric acid (1 cc.) added. The solution was boiled for five hours and then added to a solution of the sodium salt of p-sulphophenylhydrazine (125 g.) dissolved in 10% aqueous sodium carbonate (500 cc.). The resulting solution was heated on a steam bath for two hours during which time the alcohol was boiled off. On cooling the product crystallised as pale yellow microcrystals.

EXAMPLE 5

SODIUM SALT OF 1-P-SULPHOPHENYL-3-P-BROMOPHENYL PYRAZOLINE

ω - Dimethylamino - p - bromopropiophenone hydrochloride (24 g.) (prepared from p-bromoacetophenone, formaldehyde and dimethylamine hydrochloride) and phenylhydrazine p-sulphonic acid (15.5 g.) were dissolved in a mixture of 3.3% aqueous sodium carbonate (300 cc.) and ethanol (250 cc.). The solution was heated on a steam bath for three hours during which time the alcohol boiled off and on cooling the product was deposited as pale yellow plates.

EXAMPLE 6

POTASSIUM SALT OF 1-P-SULPHOPHENYL-3-P-ACETAMINOPHENYL PYRAZOLINE

P - acetamino - β - dimethylpropiophenone hydrochloride (100 g.) (prepared from p-acetaminoacetophenone, formaldehyde and dimethylamine hydrochloride) and the potassium salt of p-sulphophenylhydrazine (78 g.) were dissolved in 10% aqueous potassium carbonate (400 cc.) and the solution boiled for three hours. On cooling the product crystallised in yellow plates.

The following compounds of general Formula I can also be prepared from the appropriate intermediates by methods strictly analogous to those of the foregoing examples:

1-p-sulphophenyl-3-phenyl-5-methyl pyrazoline
1-p-sulphophenyl-3-p-tolyl-5-phenyl pyrazoline
1 - p - sulphophenyl - 3 - p -methoxyphenyl - 5-phenyl pyrazoline
1 - p - sulphophenyl - 3 - p - ethoxyphenyl - 5-phenyl pyrazoline
1 - p - sulphophenyl - 3 - p - phenoxyphenyl - 5-phenyl pyrazoline
1 - p - sulphophenyl - 3 - (p - phenyl)phenyl-5-phenyl pyrazoline
1 - p - sulphophenyl - 3 - phenyl - 5 - p - methoxyphenyl pyrazoline
1 - p - sulphophenyl - 3 - p - tolyl - 5 - p-methoxyphenyl pyrazoline
1 - p - sulphophenyl - 3:5 - di(methoxyphenyl) pyrazoline
1:4 - di(1' - p - sulphophenyl - 3' - phenyl - pyrazolinyl-5)benzene
1 - m - sulphophenyl - 3:5 - di(p - chlorphenyl) pyrazoline
1 - m - sulphophenyl - 3 - (p - phenyl)phenyl-5-phenyl pyrazoline
1-m-sulphophenyl-3:5-diphenyl pyrazoline
1(p - methyl - m - sulpho)phenyl - 3:5 - diphenyl
1(p - methyl - o - sulpho)phenyl - 3:5 - diphenyl pyrazoline
1 - (4' - sulpho - 2':5'dichlor)phenyl - 3:5-diphenyl pyrazoline
1 - (4:8 - disulphonaphthyl - 2) - 3:5 - diphenyl pyrazoline
1 - p - sulphophenyl - 3 - phenyl - 5 - α - furyl pyrazoline

What we claim is:

1. Process for the production of a compound of the general formula:

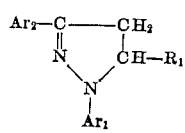

where $R_1$ is selected from the class consisting of the hydrogen atom, lower alkyl, unsubstituted phenyl, lower alkoxy phenyl and chloro phenyl, $Ar_1$ is selected from the class consisting of sulphophenyl and lower alkyl sulphophenyl, and $Ar_2$ is selected from the class consisting of unsubstituted phenyl, halophenyl, lower alkyl phenyl and lower alkoxy phenyl, which comprises condensing a ketone selected from the class consisting of ketones of the general formula $Ar_2COCH=CHR_1$ and corresponding dialkylamine addition products of the formula:

$$Ar_2COCH_2CH(R_1)N\begin{matrix}R_2\\R_3\end{matrix}$$

where $R_2$ and $R_3$ are alkyl groups, with an aryl hydrazine sulphonic acid of the formula $$Ar_1NHNH_2$$

under alkaline conditions.

2. Process according to claim 1 wherein the reaction is carried out in the presence of aqueous alkali.

3. Process according to claim 1 wherein the reaction is carried out in the presence of aqueous alkali carbonate.

4. A compound of the general formula:

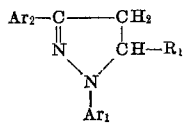

where $R_1$ is selected from the class consisting of the hydrogen atom, lower alkyl, unsubstituted phenyl, lower alkyl phenyl and chloro phenyl, $Ar_1$ is selected from the class consisting of sulphophenyl and lower alkyl sulphophenyl, and $Ar_2$ is selected from the class consisting of unsubstituted phenyl, halophenyl, lower alkyl phenyl and lower alkoxy phenyl.

5. As a new compound, 1-p-sulphophenyl-3:5-diphenyl-pyrazoline.

6. As a new compound, 1-m-sulphophenyl-3:5-diphenyl-pyrazoline.

7. As a new compound, 1-p-sulphophenyl-3-phenylpyrazoline.

8. As a new compound, 1-m-sulphophenyl-3:5-di-(p-chlorophenyl)-pyrazoline.

9. As a new compound, 1-p-sulphophenyl-3-phenyl-5-methyl pyrazoline.

JOHN DAVID KENDALL.
GEORGE FRANK DUFFIN.

References Cited in the file of this patent

UNITED STATES PATENTS

| Number | Name | Date |
|---|---|---|
| 2,153,615 | Dahlen et al. | Aug. 11, 1939 |

OTHER REFERENCES

Beilstein (Vierte Auflauge): vol. 23, p. 168, citing Berichte 54 (1921), 1011 and Berichte 59 (1926).